United States Patent [19]
Burk et al.

[11] Patent Number: 5,338,412
[45] Date of Patent: Aug. 16, 1994

[54] ELECTROCHEMICAL DEVICE FOR REMOVAL AND REGENERATION OF OXYGEN AND METHOD

[76] Inventors: Melvyn I. Burk, 21001 Halburton Rd., Beachwood, Ohio 44122; Daniel A. Scherson, 3235 Redwood Rd., Cleveland Heights, Ohio 44118

[21] Appl. No.: 874,727

[22] Filed: Apr. 27, 1992

[51] Int. Cl.$^5$ .................................. C25B 1/02
[52] U.S. Cl. ...................... 204/59 R; 204/129; 204/265; 204/266; 204/283; 204/425; 204/426
[58] Field of Search ............ 204/59 R, 265, 266, 204/296, 282, 283, 129, 425, 426; 429/33, 30, 41

[56] References Cited

U.S. PATENT DOCUMENTS

| | | | |
|---|---|---|---|
| 3,410,783 | 11/1968 | Tomter | 204/266 |
| 3,888,749 | 6/1975 | Chong | 204/129 |
| 4,061,554 | 12/1977 | Chillier-Duchatel et al. | 204/129 |
| 4,300,987 | 11/1981 | Tseung et al. | 204/129 |
| 4,475,994 | 10/1984 | Gagne et al. | 204/129 |
| 4,599,157 | 7/1986 | Suzuki et al. | 204/282 |
| 4,801,359 | 1/1989 | Jeanne et al. | 204/59 R |
| 4,859,296 | 8/1989 | Marianowski et al. | 204/129 |
| 4,908,113 | 3/1990 | Marianowski et al. | 234/243 R |
| 4,959,135 | 9/1990 | Zenner et al. | 204/129 |
| 5,084,144 | 1/1992 | Reddy et al. | 204/290 R |

OTHER PUBLICATIONS

Grant, *Hackh's Chemical Dictionary*, "Peroxide"; p. 502; 4th edition; 1969; McGraw-Hill, Inc.

*Primary Examiner*—Kathryn Gorgos
*Attorney, Agent, or Firm*—Fay, Sharpe, Beall, Fagan, Minnich & McKee

[57] ABSTRACT

An electrochemical device for concentrating oxygen is provided. The electrochemical device comprises a cathode for reducing oxygen to peroxide. An anode is provided for oxidizing the peroxide to form oxygen according to a two electron process. A solid polymer electrolyte diffuses the peroxide from the cathode to the anode.

12 Claims, 1 Drawing Sheet

ELECTROCHEMICAL DEVICE FOR REMOVAL AND REGENERATION OF OXYGEN AND METHOD

BACKGROUND OF THE INVENTION

The present invention pertains to the art of oxygen concentration, and more particularly to the art of concentrating oxygen from a gaseous mixture, such as air, according to an electrochemical device and method. The invention finds usefulness in a variety of applications and situations such as those pertaining to the medical, industrial and space exploration fields, and will be described with particular reference thereto. It should be appreciated, however, that the invention can be applied to other areas not set forth herein, particularly where concentrated oxygen is required.

There is a need for providing substantially undiluted oxygen in a variety of medical, industrial, aeronautical and space exploration situations. Numerous electrochemical methods and devices are known in the art for concentrating oxygen, but these are not without several disadvantages. Such known electrochemical devices and methods for generating oxygen are based on electrolysis using solid polymer electrolyte (SPE) technology, static feed $H_2O$ electrolysis subsystems (SFWES), or the less- developed electrolysis of carbon dioxide. Conventional electrochemical oxygen generators are based upon the electrolysis of water, a 4-electron process.

Existing solid polymer electrolyte (SPE) technology includes a thin (0.30 mm) perfluorinated sulfonic acid membrane (DuPont Nafion) which, when saturated with water, serves as an electrolyte having a resistivity of 15 ohm cm. The membrane also prevents mixing of $O_2$ and $H_2$. Catalyzed electrodes are placed in intimate contact with both sides of the membrane. Deionized water is fed to the cathode (i.e., the $H_2$ producing side of the SPE) and acts as both a reactant and a coolant. A six person life support SPE electrolyzer for manned space flight, which operates at 1.72 V per cell at a current density of 350 mA/cm$^2$, calls for an input power of 2180 W and provides an $O_2$ production rate of 6.82 kg/day. The specific power is roughly 320 W/kg $O_2$ per day.

Existing static feed water electrolysis subsystem technology (SFWES) includes thin asbestos sheets. These serve as both the water feed and the cell matrices, and are saturated with an aqueous KOH solution. As a direct current power is supplied, water in the cell matrix is electrolyzed. As a result, the KOH electrolyte concentration increases and water vapor diffuses from the feed to the cell matrix. An SFWES module which operates at 1.52 V per cell at a current density of 206 mA/cm$^2$, calls for a power consumption of 174 W, and provides a $O_2$ production rate of 0.82 kg/day. The specific power for such an operation is roughly 212 W/kg $O_2$ per day.

Another preexisting oxygen concentration method involves carbon dioxide electrolysis. An amount of $CO_2$ from a $CO_2$ concentrator is directly oxidized using a solid oxide electrolyte that is coated on both sides with a porous metal coating such as Pt. This operation takes place at high temperatures to produce $O_2$. Only oxide ions ($O^{2-}$) migrate through the solid electrolyte driven by a DC voltage so that $O_2$ separation is excellent. The processes are as follows:

| | |
|---|---|
| At cathode: | $CO_2 + 2e \rightarrow CO + O^{2-}$ |
| At anode: | $2O^{2-} \rightarrow O_2 + 4e$ |
| In another reactor: | $2CO \rightarrow C + CO_2$ |

Technological problems such as sealing exist with carbon dioxide electrolysis.

Other electrolysis technologies are known in the art. One example concerns the electrolysis of water. Electrolysis of water with $O_2$-depolarization utilizes a fuel cell type cathode and operates at a theoretical cell voltage close to zero. In practice, overpotentials at the anode and cathode, as well as IR losses, raise the cell voltage to about 1.1 V, at current densities of 108 mA/cm$^2$. The specific power requirement is about 180–200 W/kg $O_2$ per day.

Another technology involves electroregeneration of an organometallic carrier compound capable of binding $O_2$ (in a manner like hemoglobin) in its reduced state and releasing $O_2$ according to a 2-electron process upon anodic oxidation is being studied. A major parasitic reaction with respect to power consumption arises from the oxidation of a carrier which has not bound to $O_2$. The power consumption for such technology is estimated at about 30 W/kg $O_2$ per day. A limitation is the low current density of practical operation, in the range of about 1 to 2 mA/cm$^2$. It should be noted that at higher current densities, the lifetime of the organometallic is severely limited.

The electrogeneration of reducing agent 2,7-anthraquinone-disulfonate in solution reduces $O_2$ to peroxide, which is then electrochemically oxidized to $O_2$. This 2-electron process suffers from high solution IR and low energy efficiency.

Direct electroreduction of $O_2$ can produce the superoxide ion ($O_2^-$), which may be followed by diffusion to the anode and one- electron oxidation to $O_2$ at low power requirement. The key problem here is stabilization of the superoxide ion in water and avoiding coelectrolysis of water to give $H_2$ and $O_2$.

The present invention pertains to an electrochemical device and method for the selective removal and regeneration of oxygen from the ambient atmosphere. It is based on the use of a two gas-fed electrode system separated by a thin layer of liquid or solid electrolyte. An external potential difference is applied between the two electrodes to promote the reduction of dioxygen to hydrogen peroxide at the cathode. The hydrogen peroxide is then reoxidized at the anode to yield gas-phase purified dioxygen. Hence, if the cathode is exposed to the atmosphere and the anode is exposed to an enclosed environment, the device will selectively enrich the enclosed environment with oxygen.

The subject development is well suited for applications in areas where oxygen is continuously consumed in or by the enclosed environment. A difference in chemical potential or partial pressure between the atmosphere and the enclosed environment will decrease the energy requirements needed for driving the process to reasonable rates, thus providing an energy efficient and economical source for purified oxygen.

The subject new electrochemical filter and method for its application may lead to inexpensive sources of pure oxygen for medical uses and, on a larger scale, for industrial applications such as steel production or glass manufacturing.

SUMMARY OF THE INVENTION

The present invention is directed to an electrochemical device and method for concentrating and purifying oxygen.

More specifically, an electrochemical device for concentrating oxygen comprises a cathode, an anode, and a solid polymer electrolyte. The cathode, a high-area TEFLON-bonded carbon gas-fed electrode, is suited for reducing oxygen present in a gaseous feed to peroxide or superoxide. The anode, also a high area TEFLON polytetrafluoroethylene-bonded carbon gas-fed electrode, is suited for oxidizing the peroxide to form oxygen according to a two-electron process. The solid polymer electrolyte located between the cathode and anode is an ultra-thin separator membrane suited for diffusing the peroxide from the cathode to the anode.

A principal advantage of the subject development is that it provides for an oxygen concentrating unit that is more compact and of a lighter weight than oxygen concentration units of the prior art.

Another advantage of the present invention is that it provides for an oxygen concentration device having a lower power consumption at higher rates of oxygen production.

Another advantage of the present invention is that it does not call for mixing in of additional chemicals, and it is fully self-contained.

Yet another advantage of the present invention is that it provides for a useful life which is greater than that of other electrochemical oxygen concentrating devices of the prior art. Moreover, the present invention concerns a device which calls for little maintenance.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof.

DETAILED DESCRIPTION OF THE PREFERRED EMBODIMENT

Figure 1:
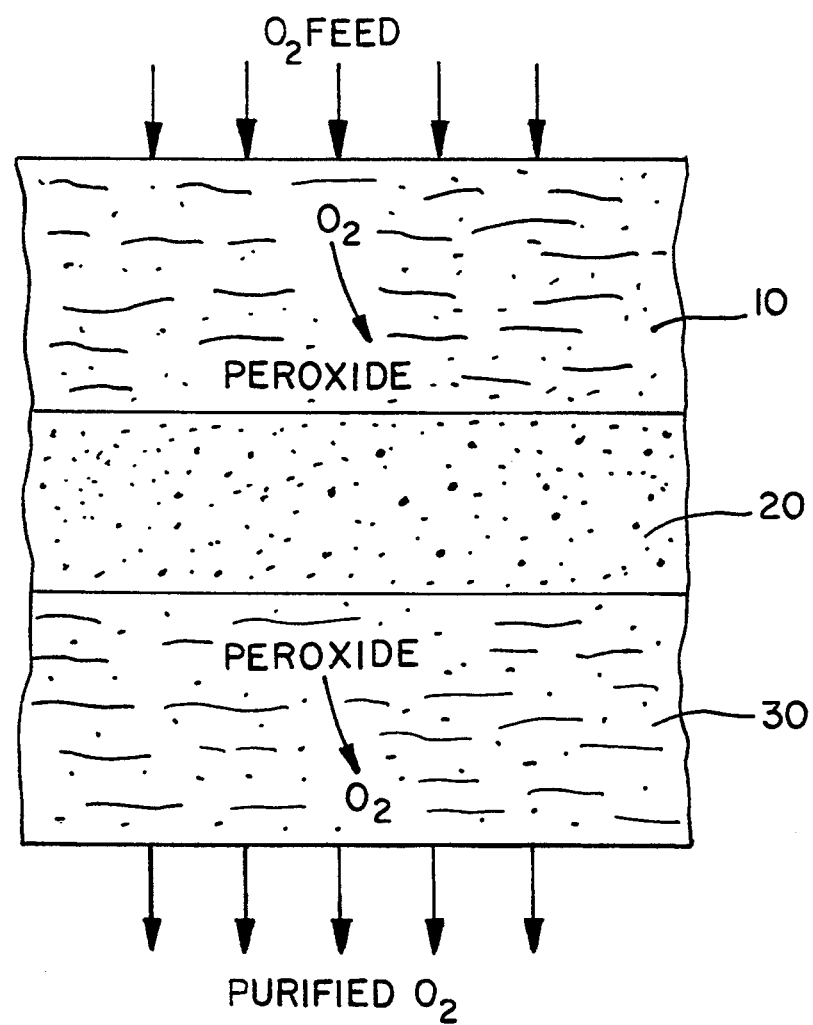
FIG. 1 is a schematic representation of an electrochemical cell formed in accordance with the present invention.

The oxygen concentrating device of the present invention takes advantage of thin film solid polymer electrolye (SPE) technology and the use of a monolithic gas-fed fuel cell type cathode structure. A gas containing a low concentration of oxygen is fed to a cathodic electrode of the device. The gas can be comprised of ambient air, or it can be supplied by an environment incompatible with life support (such as, for example, an environment too high in carbon dioxide content for human habitation). On a molar basis, air typically contains about 21% $O_2$ and 79% $N_2$.

The oxygen in the feed gas is selectively reduced at the cathode according to a two electron process to form peroxide. The peroxide is transferred through a thin separator and oxidized at the anode to form concentrated oxygen according to a two electron process. A careful search of the literature has shown that this specific approach to oxygen separation and concentration has not been previously described.

With attention now to FIG. 1, a depiction of the structure and operation of the composite electrode of the subject new development is shown. A feed gas including oxygen is fed to a cathode 10 and converted to peroxide. The peroxide diffuses or migrates through a solid polymer electrolyte (SPE) separator material 20 to the anode 30. At the anode, the peroxide is oxidized to form purified oxygen.

The reaction taking place at the cathode is as follows:

| | | |
|---|---|---|
| | $O_2 + 2H^+ + 2e^- \rightarrow H_2O_2$ | $E° = 0.695$ V |
| or | $O_2 + H_2 + 2e^- \rightarrow HO_2^- + OH^-$ | $E° = 0.649$ V |

At the anode, the following reactions take place:

$$H_2O_2 \rightarrow O_2 + 2H^+ + 2e^-$$

or $$HO_2^- \rightarrow O_2 + H^+ + 2e^-$$

Both the cathode and anode of the electrochemical oxygen concentrating device of the present invention are comprised of adherent coatings formed from fuel cell type gas diffusion electrode components on the SPE separator material.

The separator material itself may be microporous, wetted with an aqueous electrolyte, or it may be an ion-exchange membrane wetted with water. The separator material is thin.

The electrochemical reduction of oxygen to peroxide under acidic or alkaline conditions is a highly reversible process occurring at a high exchange current density. Isotopic studies of the cathodic reduction of $O_2$ to $HO_2^-$ and the reverse anodic process on high area porous carbons and alkaline solutions demonstrate that the oxygen-oxygen bond is not ruptured during these reactions. For instance, an $E°$ value on carbon for the $O_2/HO_2^-$ couple in alkaline solutions has been determined to be $-0.048$ V. Polarographic measurements at Hg provide $E° = -0.045$ V.

In contrast, the electrochemical reduction of $O_2$ to $H_2O$ or $OH^-$, and the electrolysis of water under acidic or alkaline conditions, are irreversible processes. Such processes are highly dependent on the electrode materials' catalytic capability in facilitating oxygen-oxygen bond breaking (reduction) or bond making (oxidation).

Cell voltages are dependent upon the activation overpotentials at the electrodes and on the IR contributions of the separator, electrode components, solution and electrical connections. Mixed electrochemical processes, caused by inefficiencies resulting from catalytic decomposition of peroxide and $O_2$ formation from electrolysis of water instead of peroxide, will raise the cell voltage if uncontrolled. The overall cell voltage will be close to zero volts.

Since electrolyte pumping costs are eliminated by the device discussed herein, the energy efficiency of the present development may be greater than 90%. An estimated specific power requirement assuming a cell voltage of 0.4 V at 100 mA/cm² is about 40–50 W/kg $O_2$ per day. Like conventional SPE electrolysis, the subject new device would deliver oxygen at high pressure, if needed, by back pressuring both sides of the composite. The oxygen concentrator of the subject new development is operable either continuously or cyclically.

The SPE composites as set forth in FIG. 1 can be prepared from various carbon, gold and other known separator materials. It is important that the materials and solutions used in preparing the SPE composites are of the highest purity to avoid traces of substances such as Fe, Cu, Mn, Ni, Cr and Pt. These and other substances could catalytically decompose peroxide and result in upsetting the charge balance required for efficient operation of the composites.

The thin SPE composites can be prepared according to a number of different approaches. Ion-exchange resins, microporous separator materials and even high purity paper can be used as substrates.

In preparing supported SPE composites, the ion-exchange membranes or relatively high-strength microporous separator materials such as microporous polycarbonate (e.g., Nucleopore) or polypropylene (e.g., Celgard) polymer films, or even high purity paper, can be used as substrates. These microporous materials will be well-coated or soaked in the ion exchange resin solution and dried. Ion exchange resins include materials such as Tosoh and Tosflex anionic resins. The microporous separator materials are perfluorinated materials available in thin membrane films or as solutions.

After the microporous materials have been well-coated or soaked in ion exchange resin solution and dried, a purified conductive carbon black such as Shawinigan Black is mixed with polytetrafluoroethylene (Teflon) emulsion and coated or air-brushed onto both sides of the substrate and dried in air or in a vacuum oven supported between polytetrafluoroethylene (Teflon) pressure plates. In some instances, the composites are heated to higher temperatures but below temperatures that would promote degradation of the polymeric substrates. These preparation methods correspond to procedures followed in preparing diffusion electrodes for use in fuel cells.

In unsupported SPE layers, the anionic exchange resin solution is sprayed or coated onto one surface of two uncatalyzed Teflon polytetrafluoroethylene-bonded gas diffusion electrodes. While still wet, the resin sides are sandwiched together to form the composite which will be dried under pressure. Uncatalyzed TEFLON polytetrafluoroethylene-bonded gas diffusion electrodes are available commercially.

It is within the scope of the invention to use thin carbon paper or carbon felt electrodes as an alternative to gas diffusion electrodes in a sandwich structure.

The invention will now be more fully described by way of the following Example:

EXAMPLE—CELL FABRICATION

Very thin gas-fed/gas-generating-electrode/solid polymer electrolyte structures are fabricated in order to implement the oxygen purification and concentration features described above. The overall process involves a series of steps which call for preparing a thin-film solid polymer electrolyte phase and fabricating an in situ electrode and cell. Once fabricated, the cell is tested.

A. Preparation of the Thin-Film Solid Polymer Electrolyte Phase

Two different approaches may be employed to produce very thin SPE films. A first involves a supported SPE. Here, a relatively high strength, highly porous material such as a Nucleopore microporous polycarbonate membrane or a high purity paper, is placed in contact with a solution containing the SPE, such as Nafion perfluorosulfonic acid membrane or other ionically conducting polymers. After a certain period of time has elapsed, the membrane is removed from the solution, and the excess liquid is allowed to drain. The entire structure is left to air dry.

A second approach involves unsupported SPE layers. In this instance, the SPE solution is either sprayed or painted onto the surface of a self-supported porous Teflon-bonded high area carbon electrode.

B. In situ Electrode and Cell Fabrication

A mixture of emulsified Teflon and high area carbon dispersed under ultrasonic agitation is sprayed onto each side of the supported SPE membrane, either with an atomizer or by other means, so as to form a thin layer of material. A soft felt type carbon current collector is then placed onto each of the electrodes and the entire structure pressed in a roller.

Alternatively, the entire cell is formed directly onto the carbon felt current collector by spraying in sequence 1) the high area carbon/Teflon; 2) the SPE (which could also be painted); and, 3) the other electrode. Subsequently, the second felt collector is placed on the layered structure which is then rolled by conventional means to form the complete cell.

If necessary, the cells are dried in air or under vacuum above room temperature in order to remove the emulsifier.

C. Cell Testing

Circular cells about 1 inch in diameter are pressed between two annular connectors forming behind each electrode a cavity isolated from the atmosphere. During the actual measurements, air is flowed past the cathode and an inert gas, such as argon, is flowed past the anode gas compartments. For testing purposes, air of known chemical composition is obtained from a commercial vendor while the amount of dioxygen produced at the anode is assayed using a commercial oxygen-gas sensor. Faradaic efficiencies are determined as a function of current density and temperature. Optimized conditions for cell performance are found by determining the effects associated with:

i) the partial pressure of dioxygen in the (cathode) feed gas by, for example, mixing air with pure oxygen, and ii) the decrease in the total pressure in the anode compartment.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

We claim:

1. An electrochemical device for concentrating oxygen from a feed gas, including oxygen, the electrochemical device comprising:

an uncatalyzed cathode used for reducing oxygen in the feed gas to peroxide;

a water wetted solid polymer electrolyte, comprising a polymer film selected from the group consisting of microporous polycarbonate and polypropylene, said polymer film further including an ionic exchange resin communicating with the cathode used for stably diffusing the peroxide therethrough according to a two electron process;

an uncatalyzed anode communicating with the solid polymer electrolyte used for oxidizing the peroxide to produce a high concentration of oxygen; and an external source for applying a potential difference between the cathode and the anode for promoting reduction of oxygen to peroxide and then peroxide to concentrated oxygen.

2. An electrochemical device for concentrating oxygen, according to claim 1, wherein the feed gas is air.

3. An electrochemical device for concentrating oxygen, according to claim 1, wherein the solid polymer electrolyte comprises a polymer film.

4. An electrochemical device for concentrating oxygen, according to claim 3, wherein the solid polymer electrolyte comprises a polymer film having ion exchange groups bonded thereto.

5. A method for concentrating oxygen, comprising the steps of:

bringing a gas comprising oxygen into contact with a gas-permeable cathode;

applying an external potential difference between the cathode and a gas permeable anode to promote the reduction of oxygen to peroxide and then peroxide to concentrated oxygen;

converting the oxygen to peroxide at the cathode according to a two electron process;

diffusing the peroxide through a solid polymer electrolyte wetted with water from the gas-permeable cathode to the gas-permeable anode such that the peroxide is stable as it diffuses through the electrolyte; and converting the diffused peroxide to oxygen at the anode according to a two electron process.

6. A method for concentrating oxygen, according to claim 5, wherein the gas comprising oxygen is air.

7. A method for concentrating oxygen, according to claim 5, wherein the gas permeable cathode is a high area carbon electrode.

8. A method for concentrating oxygen, according to claim 5, wherein the anode is a high area carbon electrode.

9. A method for concentrating oxygen, according to claim 5, wherein the solid polymer electrolyte comprises a polymer film having ion exchange groups bonded thereto and selected from the group consisting of microporous polycarbonate and polypropylene.

10. A method for concentrating oxygen from air, comprising the steps of:

bringing air into contact with a high area gas-permeable polytetrafluoroethylene-bonded carbon cathode electrode;

applying an external potential difference between the cathode and a high area gas permeable polytetrafluoroethylene-bonded carbon anode electrode to reduce oxygen present in the air to peroxide and then peroxide to concentrated oxygen;

converting oxygen present in the air to peroxide at the cathode electrode according to a two-electron process;

diffusing the peroxide from the cathode electrode to the anode electrode through a microporous membrane material including an ionic exchange resin wetted with water, the peroxide maintaining its stability as it diffuses;

oxidizing diffused peroxide to obtain oxygen at the anode electrode which comprises a high area gas permeable polytetrafluoroethylene-bonded carbon electrode, according to a two electron process; and enriching an enclosed area with the oxygen obtained at the anode electrode.

11. An electrochemical device for concentrating oxygen from air, comprising:

a high area, gas-permeable polytetrafluoroethylene-bonded carbon cathode used for reducing oxygen to peroxide;

a high area, gas-permeable polytetrafluoroethylene-bonded cathode anode used for oxidizing peroxide to oxygen; and a water wetted anionic exchange resin coated onto one surface of said cathode and one surface of said anode, said anionic exchange resin used for diffusing peroxide therethrough, said coated surfaces sandwiched together forming composite electrochemical device for concentrating oxygen.

12. An electrochemical device for concentrating oxygen from air, comprising:

a water wetted solid polymer electrolyte including a perfluorinated microporous separator material containing an ion exchange resin and used for diffusing peroxide according to a two-electron process;

a mixture including carbon black and polytetrafluoroethylene coated on a first side of said solid polymer electrolyte to form a cathode for reducing oxygen contained in air to peroxide; and a mixture including carbon black and polytetrafluoroethylene coated on a second side of said solid polymer electrolyte opposite the first to form an anode for oxidizing peroxide to concentrated oxygen.

* * * * *